(12) United States Patent  (10) Patent No.: US 9,257,090 B2
Tran et al.  (45) Date of Patent: Feb. 9, 2016

(54) GRAPHICAL DISPLAY OF CONTENT ON A DISPLAY DEVICE IN A SPIRAL PATTERN

(71) Applicant: Spirority, Inc., Sunnyvale, CA (US)

(72) Inventors: Phuong L. Tran, Sunnyvale, CA (US); Debdas Ghosh, Kolkata (IN); Vinh Q. Pham, Hanoi (VN)

(73) Assignee: SPIRORITY, INC., Sunnyvale, CA (US)

( * ) Notice: Subject to any disclaimer, the term of this patent is extended or adjusted under 35 U.S.C. 154(b) by 611 days.

(21) Appl. No.: 13/645,227

(22) Filed: Oct. 4, 2012

(65) Prior Publication Data

US 2014/0098140 A1  Apr. 10, 2014

(51) Int. Cl.
 *G09G 5/00* (2006.01)
 *G06F 3/14* (2006.01)
 *G06F 17/30* (2006.01)

(52) U.S. Cl.
 CPC ............ *G09G 5/00* (2013.01); *G06F 3/1446* (2013.01); *G06F 17/30* (2013.01)

(58) Field of Classification Search
 CPC .......... G09G 5/00; G06F 3/1446; G06F 17/30
 USPC ....................................................... 345/660
 See application file for complete search history.

(56) References Cited

U.S. PATENT DOCUMENTS

| 5,428,733 | A | 6/1995 | Carr | |
|---|---|---|---|---|
| 7,398,477 | B2 | 7/2008 | Accot | |
| 2009/0064225 | A1* | 3/2009 | Lee | 725/39 |
| 2010/0013757 | A1* | 1/2010 | Ogikubo | 345/156 |
| 2012/0054166 | A1* | 3/2012 | Jeremias | 707/706 |
| 2012/0060113 | A1* | 3/2012 | Sejnoha et al. | 715/783 |

FOREIGN PATENT DOCUMENTS

| GB | 2461757 A | 1/2010 |
|---|---|---|
| GB | 2487844 | 8/2012 |

OTHER PUBLICATIONS

R.A Dunlap, "The Golden Ratio and Fibonacci Numbers", p. 130, World Scientific Publishing Co. Pte. Ltd., 1997.*

* cited by examiner

*Primary Examiner* — Kee M Tung
*Assistant Examiner* — Michael Le
(74) *Attorney, Agent, or Firm* — Convergent Law Group LLP

(57) ABSTRACT

Graphical display content on a display of an electronic device includes retrieving a plurality of objects comprising the content; and displaying the plurality of objects within a plurality of panels tiled in a spiral, wherein the panels are tiled so that a size of each of the panels changes with geometric progression, and wherein relative sizes of the panels indicates an order or relevance of the plurality of objects.

30 Claims, 9 Drawing Sheets

Step 1:

Find the probability of selecting Diet Cherry Vanilla Coke or regular Cherry Vanilla Coke from all the samples.

Equation and Answer:
   (14 + 1)/30
   =15/30

FIG. 5A

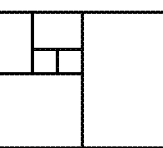

| Step 1:<br>Find the probability of selecting Diet Cherry Vanilla Coke or regular Cherry Vanilla Coke from all the samples.<br><br>Equation and Answer:<br>(14 + 1)/30<br>=15/30 | Step 3:<br>Then find the probability that all the sample, your first selection is Cherry Vanilla Coke (diet or regular) and your second is Coke with lime. |
|---|---|
| Step 2:<br>Find if the probability of selecting Coke with Lime from all the samples.<br><br>Equation and Answer:<br>(30-15)/(30-1)<br>=15/29 | Equation and Answer:<br>15/30 x 15/29<br>=225/870<br><br>As a decimal<br>=0.2586 |

FIG. 5B

FIG. 8/1
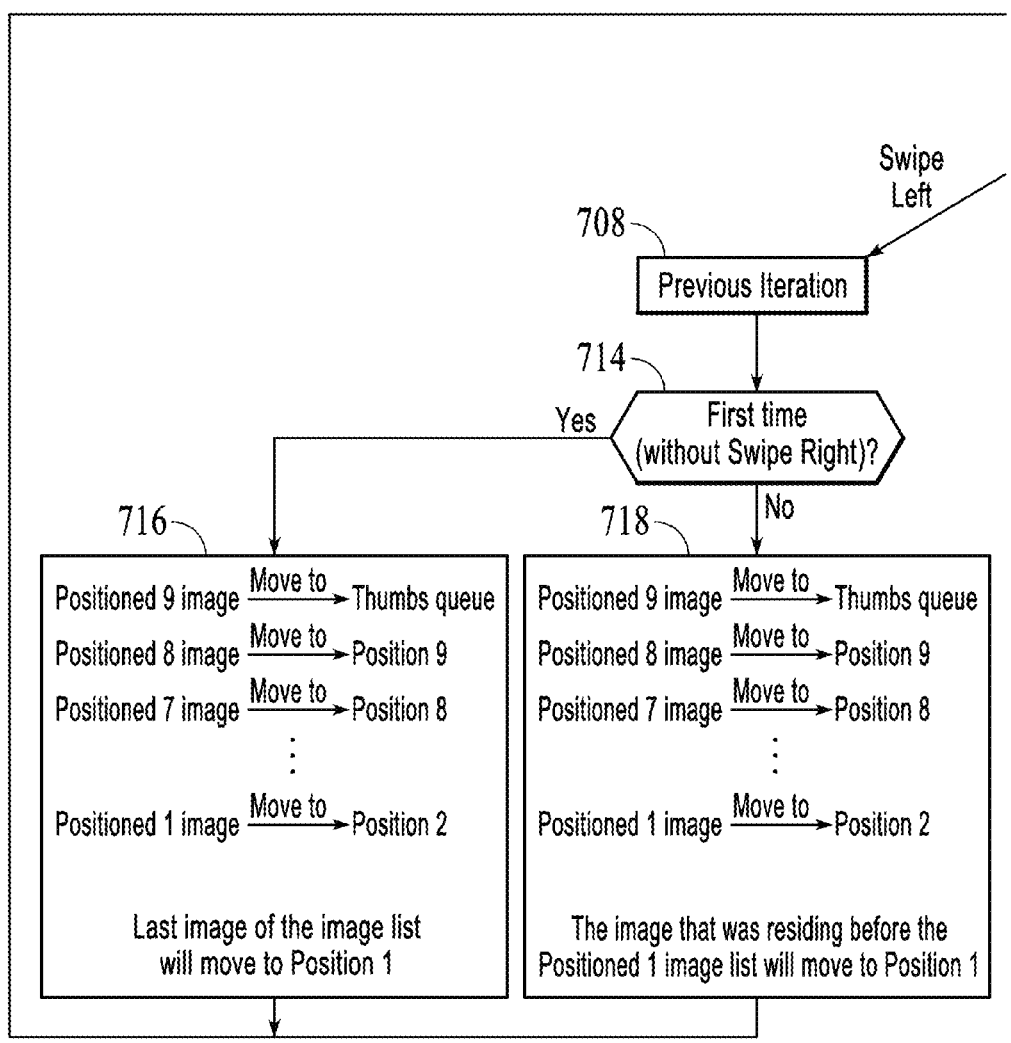

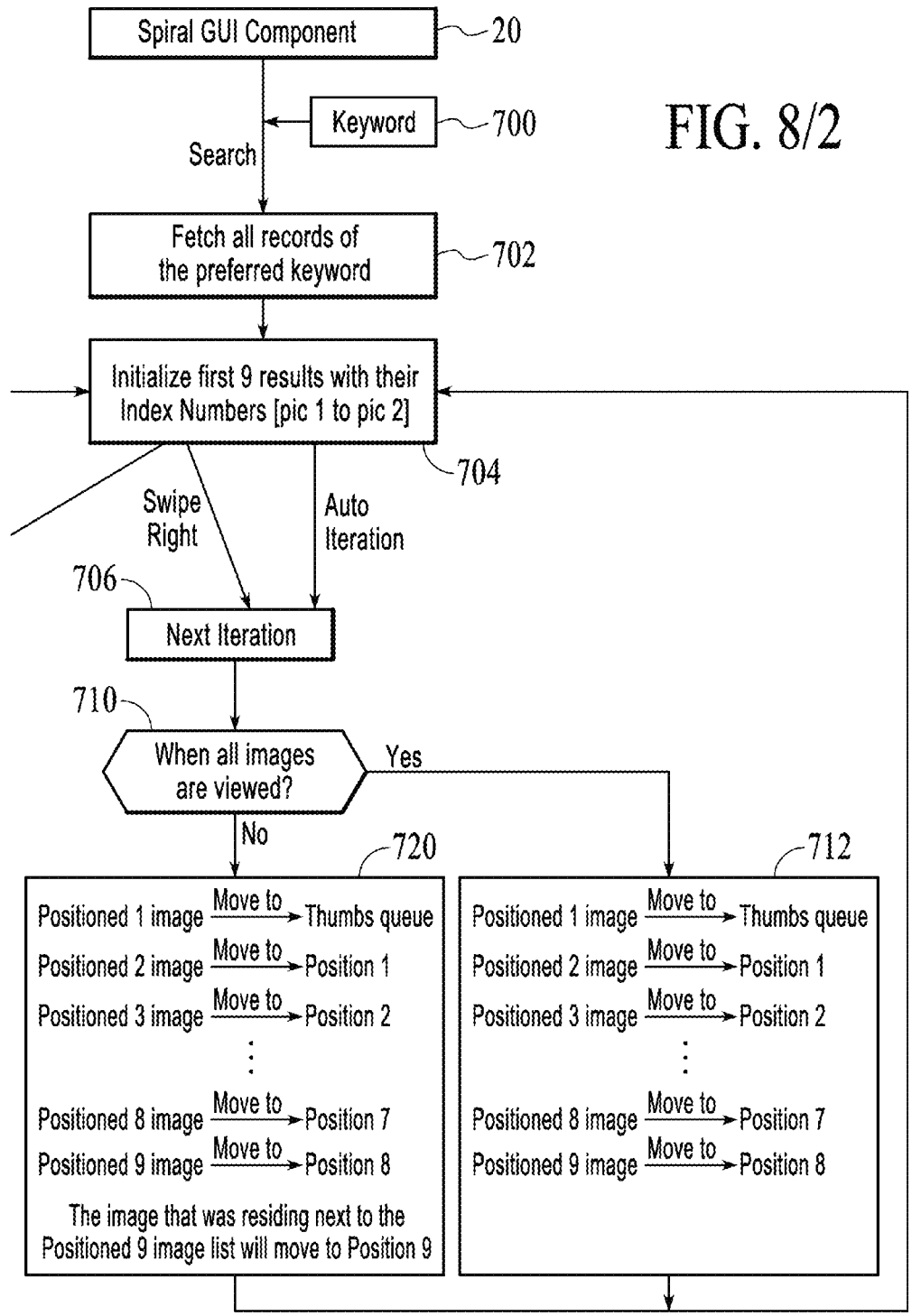
FIG. 8/2

GRAPHICAL DISPLAY OF CONTENT ON A DISPLAY DEVICE IN A SPIRAL PATTERN

BACKGROUND

When a user accesses the Internet and conducts a search, the search results are typically presented as a plurality of textual descriptions arranged as a column in list form. Often, the user wishes to obtain more information about a particular web site retrieved in the search, beyond the brief description provided in such a column of results. The additional information desired may be available only in the home page of the web site of interest.

To access the home page information, the user may take the extra step of connecting to the home page by selecting and "clicking" on the appropriate hyperlink in the list of search results. If the information so obtained is not satisfactory, the user may need to return to the descriptions in the search results, and select another hyperlink to view another home page. This process may be repeated a number of times before the user has obtained the sought for information.

It can be further appreciated that only a select few search result "hits" appear in the user column of listing descriptions at any one time. If the user wishes to view succeeding or preceding search results in another column, it may be necessary to navigate forward or backward from the current search results page being presented on the user display device.

Accordingly, it would be desirable to provide an improved method and system for displaying content on a display of an electronic device.

BRIEF SUMMARY

Exemplary embodiments provide methods and systems for graphically displaying content on a display of an electronic device performed by at least one software component executing on at least one processor. Aspects of the exemplary embodiments include: retrieving a plurality of objects comprising the content; and displaying the plurality of objects within a plurality of panels tiled in a spiral, wherein the panels are tiled so that a size of each of the panels changes with geometric progression, and wherein relative sizes of the panels indicates an order or relevance of the plurality of objects.

Displaying objects in panels tiled in a spiral is in contrast to standard search engines that display search results as a list of text links, which forces the user to click on the links to see the webpage containing the relevant information, and to conventional web album sites that display images in uniform arrays with uniform image sizes. The drawbacks of these display techniques are compounded on devices where screen real estate permits viewing only a few links or arrayed images at a time. By displaying the objects in a spiral where successive objects are displayed smaller in size, screen real estate is used efficiently to display a maximum number of images while at the same time indicating the relevance of the displayed objects.

BRIEF DESCRIPTION OF SEVERAL VIEWS OF THE DRAWINGS

FIGS. 4 and 5A-5C are diagrams showing example depictions of different types of objects displayed in a spiral.

FIG. 8 is a diagram illustrating a further embodiment the spiral GUI that includes a film strip of mini-panels displaying miniature versions of the thumbnail to be displayed in the panels of the spiral.

DETAILED DESCRIPTION

The exemplary embodiments relate to graphically displaying content on the display device and a spiral pattern. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1A:
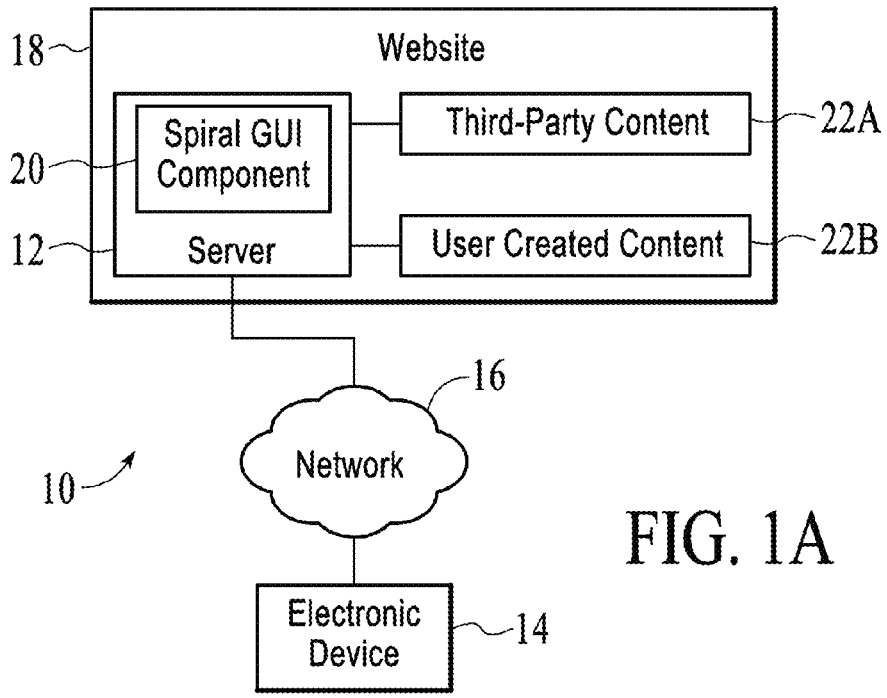
FIGS. 1A and 1B are diagrams illustrating one embodiment of a system for graphically displaying content on a display device in a spiral pattern.
Figure 1B:
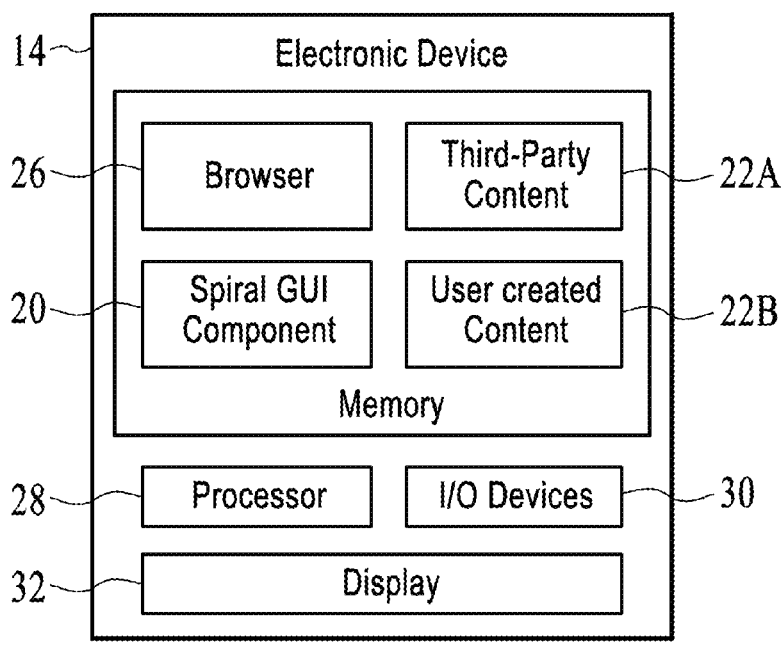

FIGS. 1A and 1B are diagrams illustrating one embodiment of a system for graphically displaying content on a display device in a spiral pattern. FIG. 1A shows an embodiment where the system 10 includes at least one server 12 in communication with at least one electronic device 14 over a network 16, such as the Internet. In one embodiment, the server 12 is part of a website 18 or web service that may serve third party content 22A or user created content 22B to electronic devices. An example of third-party content 22 may comprise search results retrieved in an Internet search. An example of user-created content 24 may comprise user compilations, such as Web albums that are created by the user of the electronic device 14. The third-party content 22A and the user created content 22B will hereinafter be referred to collectively as content 22. Once the third-party content 22 or the user created content 24 is served to the electronic device 14, a component such as a browser 26 may render the content on a display 32 of the electronic device 14.

According to one aspect of the exemplary embodiment, the server 12 may execute a spiral GUI component 20 that graphically presents the content 22 such that the more relevant aspects of the content 22 are viewable to the user. According to the exemplary embodiment, the spiral GUI component 20 displays the content 22 as objects within varying sized panels tiled in a logarithmic spiral, as described further below. In one embodiment, the relative sizes of the panels may be used to indicate relevance or importance of the contents displayed in the panels.

FIG. 1B shows an alternative embodiment in which the spiral GUI component 20 is stored and executed on the electronic device 14. The spiral GUI component 20 may display the third-party content 22 or the user created content 24, which are stored on electronic device 14. As an example, the spiral GUI component 20 may be used to display slides from a presentation application, such as Microsoft PowerPoint, photos, videos, music tracks, and the likes. In one embodiment, the spiral GUI component 20 may be implemented as a plug-in to another application. In another embodiment, the spiral GUI component 20 may be implemented as a stand-alone application.

In one embodiment, an electronic device 14 may comprise a PC, laptop, a tablet computer, a smart phone, a game system, or any other device capable of displaying information on a display screen, which may either be integrated with electronic device 14 or external therefrom. The electronic device 14 may include hardware components of typical computing devices including at least one processor 28 and input output (I/O) devices 30. Examples of input devices may include a keyboard, pointing device, microphone for voice commands, buttons, touchscreen, and the like (not shown). Examples of output devices may include a display 32 and optional speakers (not shown). The electronic device 14 may include computer-readable media, such as memory 34 and storage devices (e.g., flash memory, hard drive, optical disk drive, magnetic disk drive, and the like) containing computer instructions that implement the functionality disclosed when executed by the processor. The electronic device may further include wired or wireless network communication interfaces for communication (not shown). The server 12 is shown in FIG. 1A may include similar components.

Although the server 12 is shown as a single computer, it should be understood that the functions of server 12 may be distributed over more than one server 12, and the functionality of the spiral GUI component 20 may be implemented using a different number of software components. In one embodiment, the spiral GUI component 20 may be implemented with varying programming languages and APIs, such as PHP, HTML, CSS, Jquery, and YouTube API, for instance.

Figure 2:
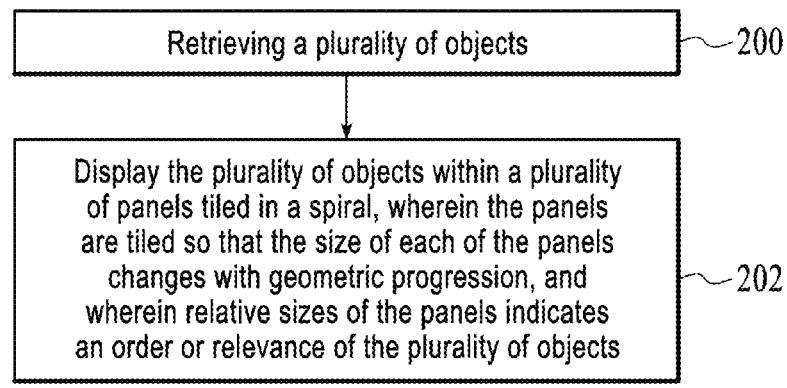
FIG. 2 is a flow diagram illustrating a process for graphically displaying content in panels arranged in a logarithmic spiral pattern according to an exemplary embodiment.

FIG. 2 is a flow diagram illustrating a process for graphically displaying content in panels arranged in a logarithmic spiral pattern according to an exemplary embodiment. The process may begin by retrieving a plurality of objects comprising the content (200).

As used herein, a plurality of objects may comprise the third-party content 22A or the user created content 22B. Example types of objects comprising the content 22 may include Internet search results, videos, photos, and slides created in a presentation program such as Microsoft PowerPoint™. In one embodiment, the objects retrieved may comprise thumbnail images of any combination of a web page, a document, text, graphics, and a video, a music track, and compilations thereof such as an online board or album.

According to one aspect of the exemplary embodiment, when retrieving objects comprising results of an Internet search, the spiral GUI component 20 translates the text search result into visual search results by retrieving thumbnail images of the respective webpages of cites returned from the Internet search. For example, the user of the electronic device may navigate to the website 18 using the browser 26, and input keywords into the spiral GUI component 20 to initiate a search. The spiral GUI component 20 then retrieves results of the search from conventional search engines, such as Google, Yahoo, Wikipedia, BING, YouTube, and like, and returns the search results to the browser 26 for display as a series of thumbnail images for display as described herein.

Once the plurality of objects are retrieved, the spiral GUI component 20 displays the plurality of objects within a plurality of panels tiled in a spiral, wherein the panels are tiled so that a size of each of the panels changes with geometric progression, and wherein relative sizes of the panels indicates an order or relevance of the plurality of objects (block 202).

Figure 3:
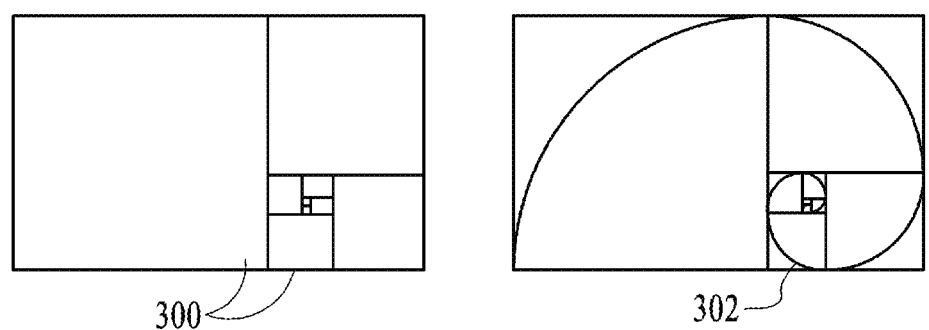
FIG. 3 shows an exemplary embodiment in which objects are displayed adjacent to one another in a spiral pattern.

FIG. 3 shows an exemplary embodiment in which objects are displayed adjacent to one another in a spiral pattern. As is well known in mathematics, a spiral is a curve on a plane that winds around a fixed central point at a continuously increasing or decreasing distance from the point (depending on direction of travel along the curve). According to the exemplary embodiment, a logarithmic spiral 302 is used in which distances between the turnings of a logarithmic spiral increase or decrease in geometric progression. In this embodiment, the objects may be displayed within, or as, a plurality of panels 300 tiled within the logarithmic spiral 302. The panels 302 are tiled so that the size of each of the panels 300 become progressively smaller in size nearer to the center point of the spiral 302, and become progressively larger in size nearer to an open end of the spiral 302. In the embodiment where a logarithmic spiral 302 is used, the sizes of the plurality of panels may have a geometric progression approximating successive Fibonacci numbers in length, e.g., from the center of the spiral panels may have relative lengths of 1, 1, 2, 3, 5, 8 and so on.

Conceptually, the panels 300 can be tiled by drawing circular arcs connecting opposite corners of successive panels, as shown, such that the panels form a tiling of neighboring squares within the logarithmic spiral 302. Thus, a pair of opposite corners of one of the plurality of panels is used as a starting point of a next panel, such that successive panels are directly adjacent to one another within a boundary of the logarithmic spiral 302. In one embodiment, the panels 300 are arranged directly adjacent to one another with no gaps between edges of neighboring panels 300. In another embodiment, the panels 300 may be arranged with gaps between the edges of neighboring panels 300.

The objects are displayed in the panels 300 of the spiral 302 such that sizes of the objects are progressively larger nearer an open end of the spiral and progressively smaller nearer the central point. In one embodiment, where the sizes of the displayed objects are used to indicate relative order or relevance of the objects and the objects represent Internet search results, the most relevant objects returned from the search may be displayed so that an object having a highest relevance is displayed in the largest panel and objects having decreasing lower relevance are displayed in decreasingly smaller panels.

The shape of the panels 300 displaying the object may be squares, or rectangles whose sides are based on golden ratio according to an exemplary embodiment. However, in an alternative embodiment, the objects 300 may be displayed in panels of any type of circular, oval, or any polygonal shape as long as tiling of the panels 300 creates a spiral effect. Finally, the panels may be arranged in the spiral 302 with the spiral 302 oriented in any direction, i.e., up/down or spiraling to the left/right.

Displaying objects in panels 300 tiled in a logarithmic spiral 302 is in contrast to standard search engines that display search results as a list of text links, which forces the user to click on the links to see the webpage containing the relevant information, and to conventional web album sites that display images in uniform arrays with uniform image sizes. The drawbacks of these display techniques are compounded on devices where screen real estate permits viewing only a few links or arrayed images at a time. By displaying the objects in a tightly wound spiral where successive object displayed smaller in size, screen real estate is used efficiently to display a maximum number of images in a manner that may indicate the relevance of the displayed objects.

Figure 4:
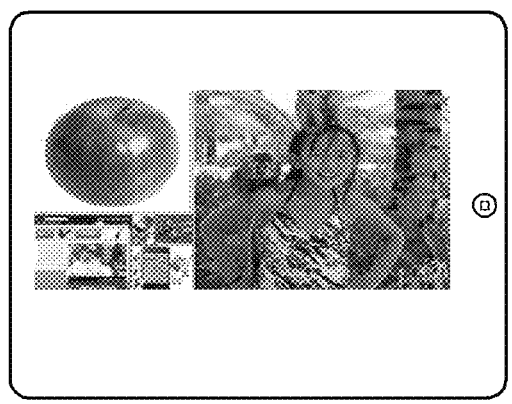
Figure 4:
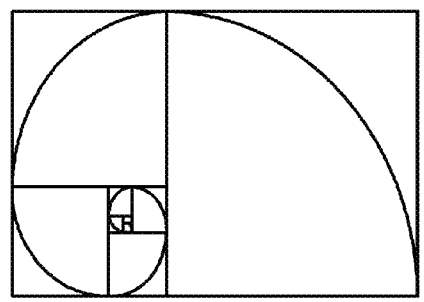

FIGS. 4 and 5A-5C are diagrams showing example depictions of different types of objects displayed in the spiral. FIG. 4 shows an example where the objects are images displayed in the panels as well as the relative sizes of the panels in the logarithmic spiral. In this example, the tiled panels of images are sized to encompass the entire display area of a tablet computer.

FIGS. 5A and 5B are diagrams showing an embodiment where objects in panels are displayed sequentially so that objects advance through the panels one by one, starting with the largest panel. In this example, the objects may be slides from a presentation program or word processor, for instance. In this embodiment, the current slide is displayed in the largest panel and previously presented slides are displayed in subsequently smaller panels. At the start of presentation shown in FIG. 5A, slide 1 of the presentation is displayed in the largest panel and the other panels are blank.

FIG. 5B shows a view of the presentation after slides 2 and 3 of the presentation have been displayed. Previous slides 1 and 2 have been advanced to immediately adjacent smaller panels in the spiral, while current slide 3 is displayed in the largest panel. The spiral pattern of the exemplary embodiment is ideal for displaying a slide presentation because while the current slide is displayed in the largest panel, previously displayed slides remain viewable to the viewer for a predetermined number of slides.

Figure 5C:
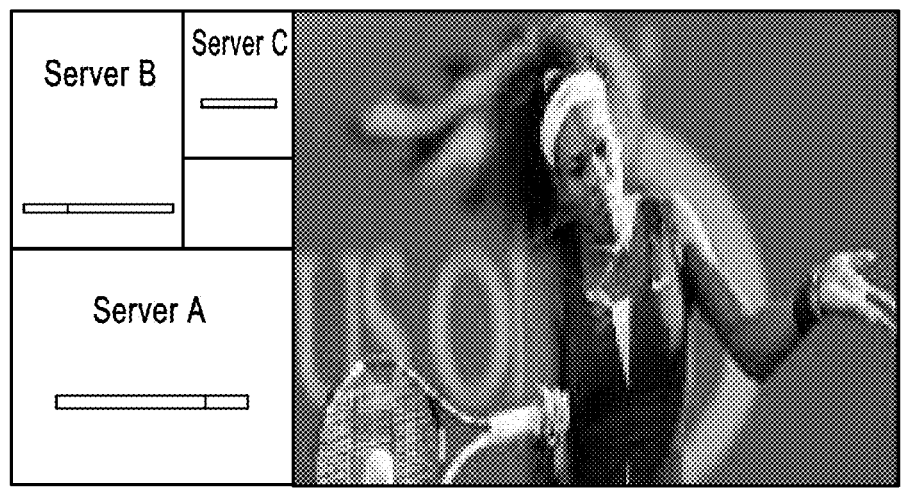

FIG. 5C is a diagram showing the spiral being used to display different channels in a video and television broadcasting environment to implement an improved picture-in-picture feature. In one embodiment, each of the panels may display a different video source. In another embodiment, the largest panel may display a top priority or most popular TV channel, while the increasingly smaller panels display decreasingly popular channels. An example of this improved picture-in-picture feature a TV network broadcasting a popular US Open Tennis Tournament, where the most important match played in the largest, Arthur Ash Stadium, is displayed in the first panel, the Luis Armstrong Stadium is displayed in the second panel, and Stadium1, the third largest stadium, is displayed and third panel. In the example shown in FIG. 5C, smaller panels in the spiral are shown displaying that the sources of the corresponding videos are Server A, Server B, and Server C.

In another embodiment, the spiral may be used in a file sharing environment where the size of each panel represents the downloaded or uploaded percentage of the files. The file that users can retrieve in the least amount of time may be shown in the larger panel. In this way, content, such as video files, may be viewed in a manner that reduces the time for video buffering.

According to a further aspect of the exemplary embodiment, the spiral GUI component 20 may be configured to detect a user gesture to display other retrieved objects not yet visible in the spiral. Examples of gestures include a mouse click on a PC/laptop, or a swipe on a touchscreen. In response to detecting the gesture, the spiral GUI component 20 may advance display of the plurality of objects 300 one position in the panels 300 along the spiral 302, removing a previously displayed object from one end of the spiral, and adding the next object to be displayed to the opposite end of the spiral.

Calculation of Dimensions and Position of Displayed Objects

Figure 6:
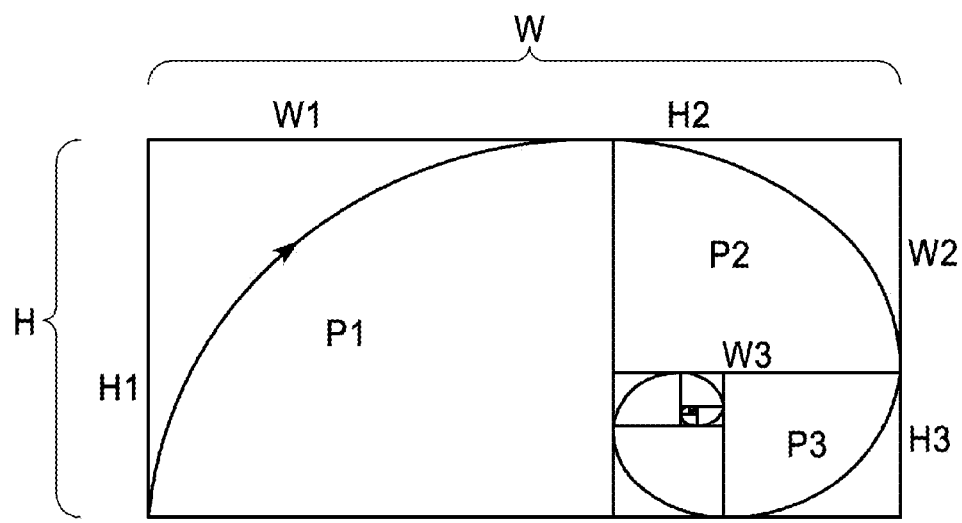
FIG. 6 is a diagram showing example heights (H) and widths (W) for 3 panels tiled in a logarithmic spiral.

FIG. 6 is a diagram showing example heights (H) and widths (W) for 3 panels tiled in a logarithmic spiral. In one embodiment, the spiral GUI component 20 may calculate the dimensions and position of objects displayed in the panels as follows:

1. An available screen area having a height (H) and with (W) is determined and a height/width (H/W) ratio is calculated. The objects are to be displayed in a series of panels that fit within the available screen area in proportionally smaller sizes based at least in part on the height/width ratio, wherein an opposite pair of corners of a current panel is used as a starting point of a next panel.

2. The available screen area is then divided into three panels P1, P2 and 3 proportionally where the H/W ratio of the three panels is the same. In FIG. 6 the height and width of P1 are H1 and W1, the height and width of P2 are H2 and W2, and the height and width of P3 are H3 and W3.

2.3 Formula of determining Hn, Wn:

Available Screen Height: H, Available Screen Width: W (known variable)

$H/W = r$ (ratio)

$W1 = H/r$ $H1 = H$ $H2 = W - W1$ $W2 = H2 \times r$

In the first iteration of the above formula, FIG. 6 shows that the height H1 of P1 is equal with the Height (H) of the available screen space, the width W1 of P1 and the height H2 of P2 (W1 +H2) is equal to the Width (W) of the available screen space, and W2+H3=H1=H. The panels can be tiled to form an upward or downward spiral.

In one embodiment, rather being calculated, the ratio "r" may comprise a predetermined number, such as the Golden ratio 1.618.

H3 and W3 of panel P3 are defined as dimensions of the next available screens space and this next available screen space is divided proportionally into three areas based on the algorithm above. The process is repeated until the number of visible panels matches a predetermined number (e.g., 9).

FIG. 6 shows that after the largest panel, P1, is positioned on either the left or right side of the available screen area, the starting point for each subsequent panel can be determined by connecting opposite corners of the previous panel with an arc, and then connecting the arc with a similar arc across the subsequent panel to provide a continuous spiral line through the panels. If starting from the center point, the panels may be displayed so that the side of each subsequent panel is adjacent and equal to the lengths of the previous two panels.

Uses

As stated above, a primary use of the spiral GUI may be for the display of search results. In response to a keyword being typed in a search field, the spiral GUI component 20 may be configured to retrieve visual search results as an ordered set of images. In one embodiment, the search terms may be sent to an available visual search engines. The visual search engines may return a list of ordered uniform resource locators (URLs) corresponding to links to found results. A third-party service may then resolve the links and generate thumbnail images of the corresponding web pages. The spiral GUI component 20 may then receive an ordered set of thumbnail images from the third-party service. The N most relevant thumbnails are then displayed in the panels, where N is the number of visible panels and the most relevant thumbnail displayed in the largest panel.

Another use for the spiral GUI may be to create a presentation or display board for learning, similar to the use of the spiral GUI as a slide presentation. Conventional means of displayed to not allow users to view past "slides" immediately without scrolling up and down or sideways. In contrast, the exemplary embodiments provide viewers a time delayed to connect a pass slide with the current slide show in the past slides on the same screen the proportionally smaller in size according to the connections of the past slides with the current slide. For example slide 9 has the strongest connection with a current slide 10 than slide 8, thus slide 9 has a larger panel display space than slide 8.

Yet another use the spiral GUI may be as a space to simultaneously view a primary source in the largest panel, and secondary sources associated with the primary source in the smaller panels. For example, a page of a book or the website may be displayed in the largest panel, while the remaining continuously smaller panels may display search results whenever a keyword, image, symbol or combination thereof are selected from the material in the largest panel.

Finally, the spiral GUI may be used to display 3-D content, where the smallest panel is deemed closest to the viewer. By this arrangement, the maximum amount of information can be displayed within a limited amount of space between the viewer and the display screen of the device.

Navigation

Figure 7:
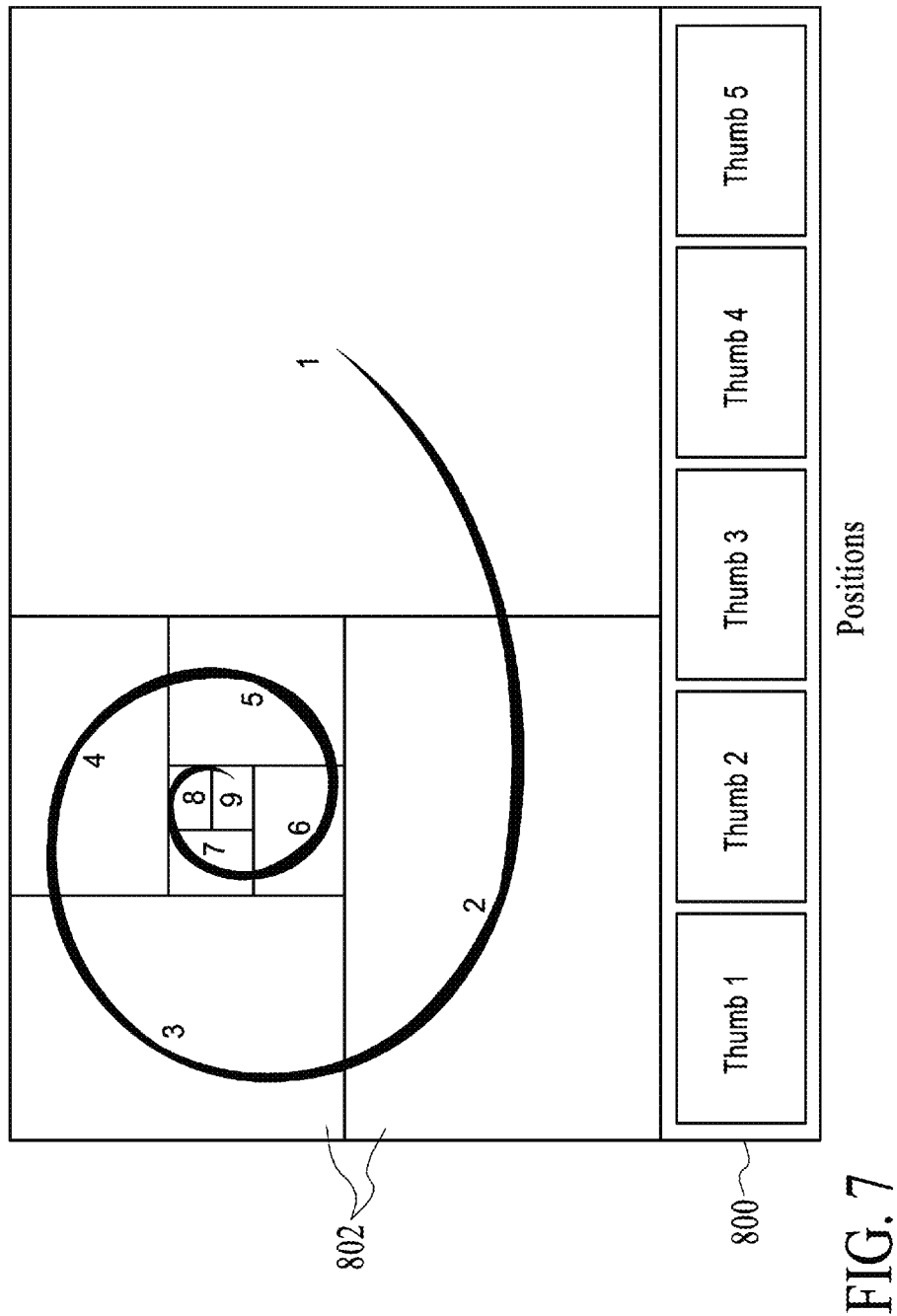
FIG. 7 is a flow diagram illustrating a process for advancing images through the spiral panels in response to user gestures.

FIG. 7 is a diagraming illustrating a further embodiment of the spiral GUI that includes a film strip of mini-panels 800 showing thumbnails of miniature versions of the objects to be displayed in the panels 802 of the spiral.

In another embodiment, the panels 802 of spiral may be used to display objects comprising web albums, which are a collection of items a user may find interesting. In one embodiment, a web album may contain an unlimited number of tracks. The track may comprise a photo, video, audio file, music album, a YouTube channel, the web address, a shared document, or even another web album.

According to one embodiment, each well that may be assigned one master track. The concept of a matched track similar to a song a music album, or any album cover. Master track is typically the most relevant track in the web album and the one user most likely wants to view. In one embodiment, once the master track is assigned to a web album, the master track is displayed and remains in the largest panel, while the tracks are displayed in the smaller panels on a rotation basis. In another embodiment, the master track may be configured to be displayed within one of the inner panels. In another embodiment, thumbnail images of the tracks comprising the web album may be displayed in the mini panels 800.

In another embodiment, the panels 800 may be presented and displayed a website, e.g., Spiralboard.com, which enables users to assemble web albums from other web content and display those web albums within the spiral panel GUI. In this embodiment, the master track may be used as a summary of the contents of the web album. As an example, assume that a user wants to find information about the city of New York from which he has just visited. In the user may navigate to Spiralboard.com and search for a shared album regarding the city of New York created by registered users. Assume that the user finds a New York travel created and shared by a user named Philip. When Philip's web album is displayed, the user may refer to the album's master track and hopefully find a summary of information is looking for, without having to browse all the tracks in the album.

FIG. 8 is a flow diagram illustrating details of the process for advancing images through the spiral panels in response to user gestures. Referring to FIGS. 7 and 8, the flow diagram begins with the spiral GUI component 20 receiving keywords entered into a search field (block 700). The spiral component 20 fetches the images comprising the search results (block 702). In one embodiment, the images are received as an ordered set based on relevance (e.g., Image list=Image 1, Image 2, Image 3, . . ., Image n). In this example, nine panels 802 are displayed in the spiral in a clockwise manner. The spiral GUI component 20 displays the most relevant 9 images in the spiral starting with the largest panel, panel 1 (block 704). In one embodiment, index numbers could also be displayed with the images.

Once images are displayed within the panels 802 of the spiral GUI, the spiral GUI component may begin auto iteration in which the next iteration of images is displayed if a user swipe left or right is not detected within a predetermined amount of time (block 706). Iteration of the images refers to the scrolling of the images from one panel to the next in fixed intervals of time. For example, image 2 will be displayed in panel 1, image 3 will be displayed in panel 2, and so on, and image 10 will be displayed in panel 9.

In response to detecting a swipe right from the user (with a mouse or finger), the spiral GUI component 20 displays the next iteration of images (block 706). In response to detecting a swipe left, the spiral GUI component 20 displays the previous iteration of images may be displayed (block 708).

From here, when it is determined the user swipes right (block 710) and if it determined that all images have been displayed at least one time in any of the panels 802, then algorithm (block 712) will be invoked to advance the images in the panels as follows. The image in panel 1 will move to the film strip of mini-panels 800, the image in panel 2 will move to panel 1, the image in panel 3 will move to panel to an so forth. In this algorithm, the first image of the image list may move to panel 9 and so on.

However, when it is determined that all images have not been displayed at least one time in any of the panels 802 (block 714), then algorithm (block 720) will be invoked to advance the images in the panels as follows. Image in panel 1 to move to the film strip of mini-panels 800, the image in panel 2 will move to panel 1, the image in panel 3 will move to panel to an so forth. The image that resides in the ordered set of images next to the image previously displayed in panel 9 will move to take its position in panel 9.

If it is determined the user swipes left and the previous iteration is reached (block 708) and the user has not swiped right, then algorithm (block 716) is invoked. The image in panel 9 will move to the film strip of mini-panels 800, image in panel 8 will move to panel 9, image in panel 7 was to panel 8 and so on. The image residing in the last position of the ordered image list of move to panel 1 and so on, i.e., the ordered set of images is treated as a circular queue.

However, if it is determined the user swipes right (block 714), then algorithm (block 718) is invoked. The image in panel 9 will move to the film strip of mini-panels 800, the image in panel 8 will move to panel 9, the image in panel 7 will move to panel 8 and so on. Here, the office and screen image residing next to the image previously displayed in panel 1 will move to panel 1.

This process is fully reversible as is depicted in the diagram.

A method and system for graphically displaying content on a display of an electronic device has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A method for graphically displaying content on a display of an electronic device performed by at least one software component executing on at least one processor, the method comprising:
   receiving a plurality of objects comprising the content in response to a search request;
   determining an available screen area on the display and determining a height/width ratio of the available screen area;
   dividing the available screen area into n panels, each of the n panels having the same H/W ratio;
   tiling, by the processor, the panels into a logarithmic spiral on the display within the available screen area based at least in part on the height/width ratio such that a size of each of the panels changes with geometric progression, and wherein an alignment between a pair of diagonally opposite corners of one of the plurality of panels is used as a starting point of a next panel so that the panels are arranged directly adjacent to one another with no gaps between edges of neighboring panels within a boundary of the logarithmic spiral;
   displaying, by the processor, the plurality of objects returned from the search in the panels so that an object having a highest relevance is displayed in a largest panel and objects having decreasing lower relevance are displayed in decreasingly smaller panels; and
   responsive to detecting a user gesture to display other ones of the objects not yet visible on the display: advancing display of the plurality of objects one position along the spiral, removing a previously displayed object from one end of the spiral, and adding a next object to be displayed to an opposite end of the spiral.

2. The method of claim 1 wherein the plurality of panels become progressively smaller in size nearer to a center of the spiral, and become progressively larger in size nearer to an open end of the spiral.

3. The method of claim 1 wherein the sizes of the plurality of panels have a geometric progression approximating Fibonacci numbers in length.

4. The method of claim 1 wherein the plurality of objects comprise at least one of: Internet search results, slides created in a presentation program, videos, and thumbnail images of any webpage or document.

5. The method of claim 1 wherein the plurality of objects comprise channels in a video or television broadcasting environment in which a picture-in-picture feature is implemented, wherein each of the panels displays a different video source.

6. The method of claim 1 wherein displaying the plurality of objects further comprises displaying the objects in the panels sequentially so that the plurality objects advance through the panels one by one, starting with a largest one of the panels.

7. The method of claim 1 wherein displaying the plurality of objects further comprises displaying a primary source in a largest panel, and displaying at least one secondary source in smaller panels.

8. The method of claim 1 wherein displaying the plurality of objects further comprises displaying a film strip of mini-panels showing miniature versions of the plurality of objects to be displayed in the panels of the spiral.

9. The method of claim 1 wherein displaying the plurality of objects further comprises displaying web albums that contain a plurality of tracks and a master track, wherein the master track is displayed in a largest panel, and the plurality of tracks are displayed in smaller panels on a rotation basis.

10. The method of claim 1 further comprising displaying panels in the spiral as part of a website enables users to assemble web albums from other web content and to display those web albums within the panels.

11. An executable software product stored on a non-transitory computer-readable medium containing program instructions executed by a processor for graphically displaying content on a display of an electronic device, the program instructions for:
    receiving a plurality of objects comprising the content in response to a search request;
    determining an available screen area on the display and determining a height/width ratio of the available screen area;
    dividing the available screen area into n panels, each of the n panels having the same H/W ratio;
    tiling, by the processor, the panels into a logarithmic spiral on the display within the available screen area based at least in part on the height/width ratio such that a size of each of the panels changes with geometric progression, and wherein an alignment between a pair of diagonally opposite corners of one of the plurality of panels is used as a starting point of a next panel [so that the panels are arranged directly adjacent to one another with no gaps between edges of neighboring panels within a boundary of the logarithmic spiral];
    displaying, by the processor, the plurality of objects returned from the search in the panels so that an object having a highest relevance is displayed in a largest panel and objects having decreasing lower relevance are displayed in decreasingly smaller panels; and
    responsive to detecting a user gesture to display other ones of the objects not yet visible on the display: advancing display of the plurality of objects one position along the spiral, removing a previously displayed object from one end of the spiral, and adding a next object to be displayed to an opposite end of the spiral.

12. The executable software product of claim 11 wherein the plurality of panels become progressively smaller in size nearer to a center of the spiral, and become progressively larger in size nearer to an open end of the spiral.

13. The executable software product of claim 11 wherein the sizes of the plurality of panels have a geometric progression approximating Fibonacci numbers in length.

14. The executable software product of claim 11 wherein the plurality of objects comprises at least one of: Internet search results, slides created in a presentation program, videos, and thumbnail images of any webpage or document.

15. The executable software product of claim 11 wherein the plurality of objects comprise channels in a video or television broadcasting environment in which a picture-in-picture feature is implemented, wherein each of the panels displays a different video source.

16. The executable software product of claim 11 wherein the program instructions for displaying the plurality of objects further comprises displaying the objects in the panels sequentially so that the plurality objects advance through the panels one by one, starting with a largest one of the panels.

17. The executable software product of claim 11 wherein the program instructions for displaying the plurality of objects further comprise displaying a primary source in a largest panel, and displaying at least one secondary source in smaller panels.

18. The executable software product of claim 11 wherein the program instructions for displaying the plurality of objects further comprise displaying a film strip of mini-panels showing miniature versions of the plurality of objects to be displayed in the panels of the spiral.

19. The executable software product of claim 11 wherein the program instructions for displaying the plurality of objects further comprises program instructions for displaying web albums that contain a plurality of tracks and a master track, wherein the master track is displayed in a largest panel, and the plurality of tracks are displayed in smaller panels on a rotation basis.

20. The executable software product of claim 11 further comprising program instructions for displaying panels in the spiral as part of a website enables users to assemble web albums from other web content and to display those web albums within the panels.

21. A system, comprising:
a memory;
a processor coupled to the memory; and
a software component executed by the processor that is configured to:
receiving a plurality of objects comprising the content in response to a search request;
determine an available screen area of a display and determining a height/width ratio of the available screen area;
divide the available screen area into n panels, each of the n panels having the same H/W ratio;
tile the panels into a logarithmic spiral on the display within the available screen area based at least in part on the height/width ratio such that a size of each of the panels changes with geometric progression, and wherein an alignment between a pair of diagonally opposite corners of one of the plurality of panels is used as a starting point of a next panel [so that the panels are arranged directly adjacent to one another with no gaps between edges of neighboring panels within a boundary of the logarithmic spiral];
display the plurality of objects returned from the search in the panels so that an object having a highest relevance is displayed in a largest panel and objects having decreasing lower relevance are displayed in decreasingly smaller panels; and
responsive to detecting a user gesture to display other ones of the objects not yet visible on the display: advance display of the plurality of objects one position along the spiral, removing a previously displayed object from one end of the spiral, and adding a next object to be displayed to an opposite end of the spiral.

22. The system of claim 21 wherein the plurality of panels become progressively smaller in size nearer to a center of the spiral, and become progressively larger in size nearer to an open end of the spiral.

23. The system of claim 21 wherein the sizes of the plurality of panels have a geometric progression approximating Fibonacci numbers in length.

24. The system of claim 23 wherein the plurality of objects comprise at least one of: Internet search results, slides created in a presentation program, videos, and thumbnail images of any webpage or document.

25. The system of claim 21 wherein the plurality of objects comprise channels in a video or television broadcasting environment in which a picture-in-picture feature is implemented, wherein each of the panels displays a different video source.

26. The system of claim 21 wherein the software component is further configured to display the objects in the panels sequentially so that the plurality objects advance through the panels one by one, starting with a largest one of the panels.

27. The system of claim 21 wherein the software component is further configured to display a primary source in a largest panel, and display at least one secondary source in smaller panels.

28. The system of claim 21 wherein the software component is further configured to display a film strip of mini-panels showing miniature versions of the plurality of objects to be displayed in the panels of the spiral.

29. The system of claim 21 wherein the plurality of objects comprise web albums that contain a plurality of tracks and a master track, wherein the master track is displayed in a largest panel, and the plurality of tracks are displayed in smaller panels on a rotation basis.

30. The system of claim 21 wherein the software component is further configured to display the panels as part of a website enables users to assemble web albums from other web content and to display those web albums within the panels.

* * * * *